United States Patent [19]

Chow et al.

[11] Patent Number: 4,566,488
[45] Date of Patent: Jan. 28, 1986

[54] MULTI-STAGE PRESSURE REDUCING SYSTEM

[75] Inventors: Peter C. M. Chow, Newark; Walter L. Connolly, Moraga, both of Calif.

[73] Assignee: Grove Valve and Regulator Company, Oakland, Calif.

[21] Appl. No.: 201,444

[22] Filed: Oct. 28, 1980

[51] Int. Cl.$^4$ .................. G05D 16/16; F16K 7/02
[52] U.S. Cl. .................. 137/613; 137/486; 137/489; 137/492
[58] Field of Search .......... 137/489, 506, 613, 492, 137/492.5, 486

[56] References Cited

U.S. PATENT DOCUMENTS 2,741,262  4/1956  Crookston .............. 137/506 X
4,026,513  5/1977  Callenberg ............. 137/489 X

*Primary Examiner*—Alan Cohan
*Attorney, Agent, or Firm*—Melvin R. Stidham

[57] ABSTRACT

A multi-stage pressure regulating system including a pilot-governed main pressure reducing regulator, with one or more passive back pressure regulators arranged in tandem therewith. The regulators are valves of the type conditioned to open when the upstream pressure therein overcomes a jacket pressure. The jacket in the main valve is loaded by upstream fluid, but a pilot, which monitors a particular fluid flow characteristic, such as pressure, at a selected location in the pipeline, controls bleeding of the jacket as necessary to regulate flow through the main valve so as to maintain a predetermined value or level of the characteristic being monitored. Hence, flow through the main valve is controlled solely by the pilot device, but its discharge to the ultimate downstream level is through at least one auxiliary valve, the jacket of which is loaded with a pneumatic pressure at a suitable level, so that the pressure drop to the downstream level is in two or more stages.

10 Claims, 4 Drawing Figures

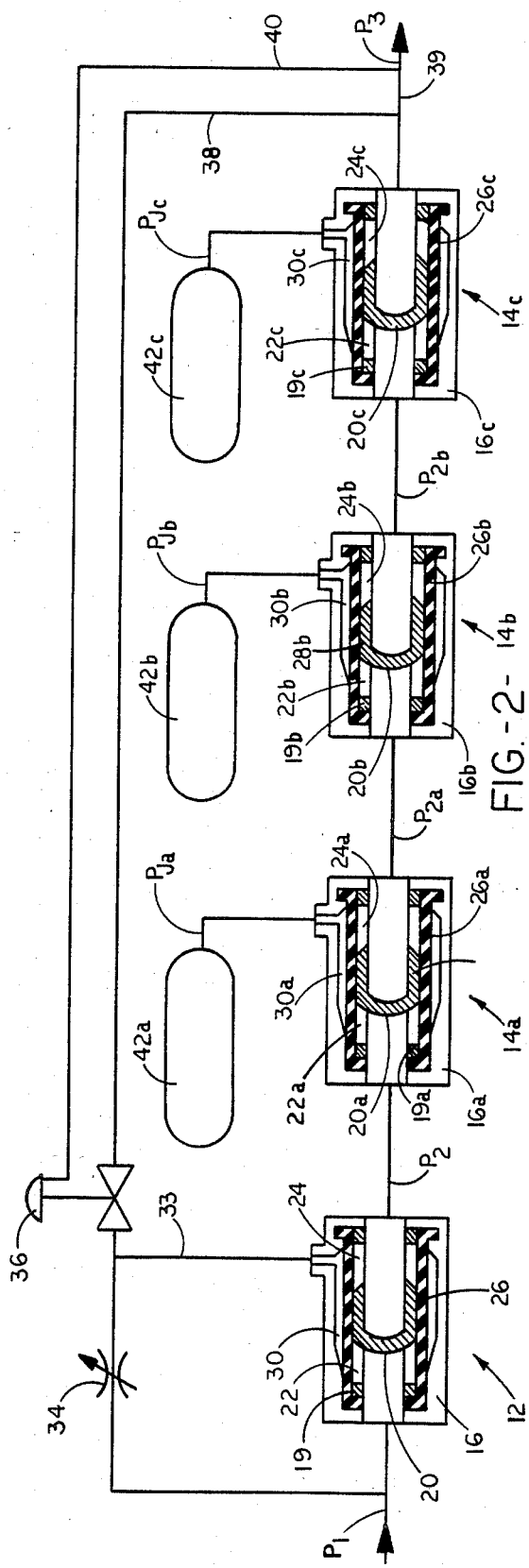
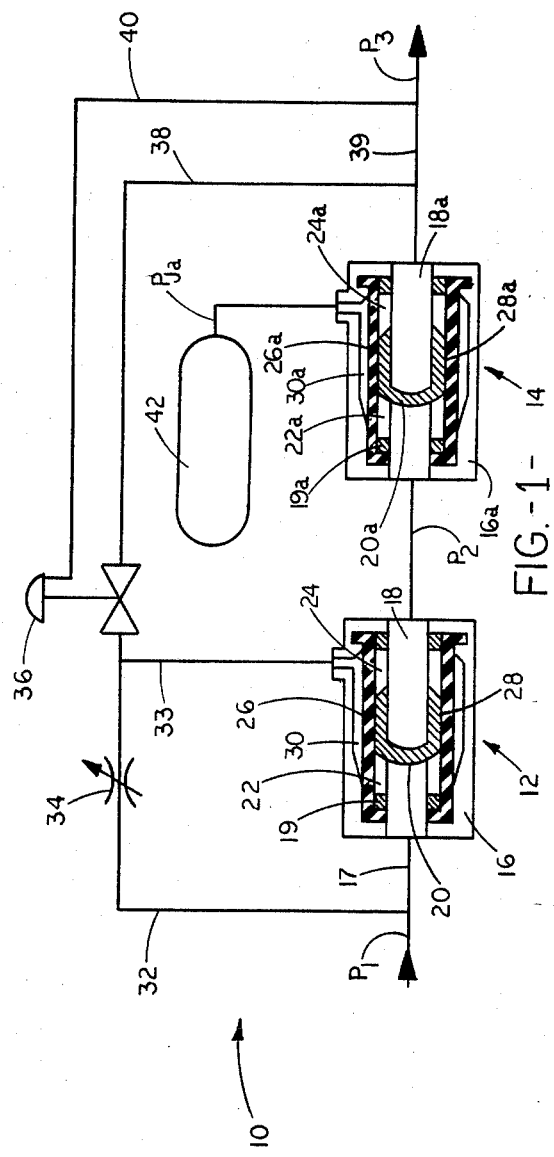

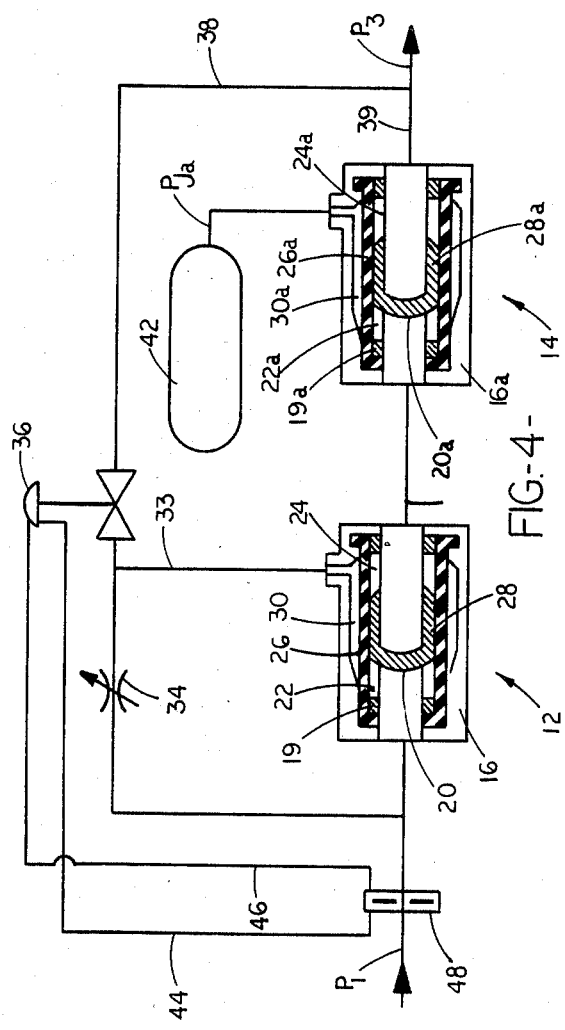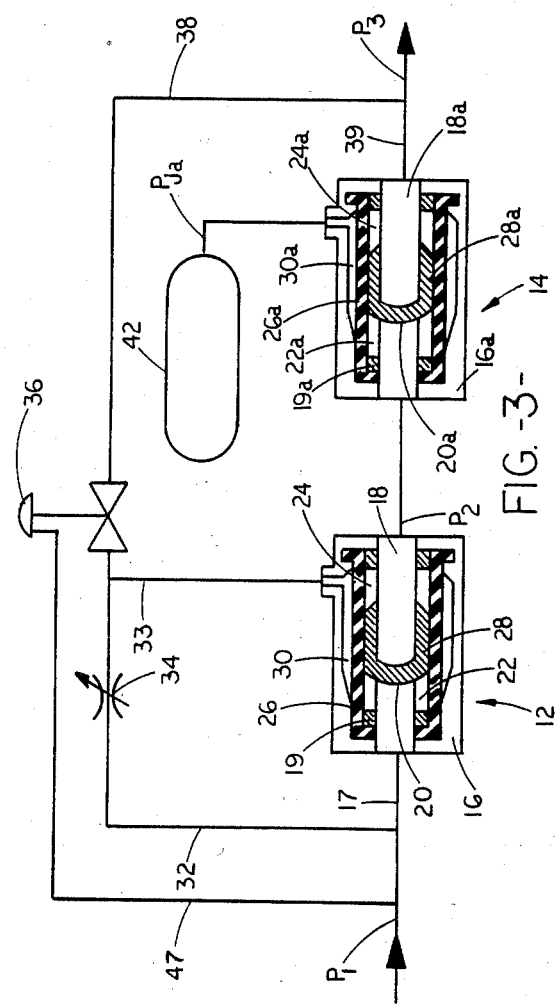

/ 1

MULTI-STAGE PRESSURE REDUCING SYSTEM

BACKGROUND OF THE INVENTION

Cavitation is frequently encountered in liquid pipelines when regulators are employed to reduce pressures substantially from a relatively high initial level. Cavitation, in turn, may produce excessive noises and unstable operation, and may result in damage to the regulators and associated piping. Previously, others have solved the problem of cavitation by reducing the liquid pressure in two or more stages. However, such multi-stage systems often result in unstable or cycling operations when pilot operated regulators interact with one another.

OBJECTS OF THE INVENTION

It is an object of this invention to provide a multi-stage pressure reducing system including two or more pressure regulators, which are installed so as not to interact with each other.

It is a further object of this invention to provide a pressure reducing system for a liquid pipeline which enables a substantial drop in pressure without cavitation from a high upstream pressure to a lower downstream pressure.

Other objects and advantages of this invention will become apparent from the description to follow, particularly when read in conjunction with the accompanying drawings.

SUMMARY OF THE INVENTION

In carrying out this invention, we provide an expansible tube type pressure regulator which opens when upstream pressure overcomes pressure in a control chamber or jacket to expand the expansible tube. Normally, the jacket is loaded by upstream fluid, but is bled through a pilot device that monitors pressure or flow rate at a selected location in the pipeline and controls the jacket pressure so as to enable enough flow through the main regulator to maintain the monitored fluid flow characteristic value. Flow from the main regulator is passed through an auxiliary back pressure regulator having a fixed pneumatic jacket pressure which is at a level intermediate the upstream pressure and the downstream pressure. Hence, the pressure drop is in two stages, with the auxiliary stage being passive and the first or main stage being controlled by the pilot device monitoring the controlled pressure or flow rate.

BRIEF DESCRIPTION OF THE DRAWING

In the drawing:

FIG. 1 is a schematic view of the fluid pressure reducing system of this invention;

FIG. 2 is a modification of the system of FIG. 1;

FIG. 3 is a schematic view of a back pressure control system; and

FIG. 4 is another embodiment of this invention for flow control.

DESCRIPTION OF PREFERRED EMBODIMENTS

The Embodiment of FIG. 1

Referring now to FIG. 1 with greater particularity, the fluid pressure control system 10 of this invention includes a main control regulator 12 and an auxiliary passive back pressure regulator 14, both of which may be of the expansible tube type, such as that shown in U.S. Pat. No. 3,306,569, granted Feb. 28, 1967 to A. U. Bryant. Such expansible tube type valves include a housing 16 with upstream and downstream flow passages 17 and 18. The valve housing 16 carries a cage 19 with an intermediate barrier 20 and upstream and downstream slots 22 and 24 therein for flow around the barrier 20. A flexible sleeve 26 which is sealed at its opposite ends in the housing 16 is stretched around a cylindrical surface 28 to seal around the barrier 20. Flow is enabled when upstream pressure $P_1$ in the upstream passage 17, overcomes the pressure in a jacket 30 surrounding the resilient sleeve 26.

In the main regulator 12, the pressure in the chamber or jacket 30 is controlled by a suitable pilot device of any suitable design. For example, a load line 32, 33 may supply upstream pressure from the line 17 through an orifice 34. A pilot valve 36 may be installed in a bleed line 38 connected to the jacket 30, or to the load line 33 downstream of the orifice 34.

When installed to monitor downstream pressure $P_3$, a flow characteristic signal sensor conductor, such as line 40 may be connected to the downstream line 39, and the pilot 36 is set to bleed off enough pressure from jacket 30, as necessary to regulate flow through the main regulator valve 12 in order to maintain downstream pressure $P_3$ at the desired level.

In the present system 10, an auxiliary passive back pressure regulator 14 is interposed between the main regulator 12 and the ultimate downstream line 39. Since the auxiliary regulator 14 may be of the same general type as the principal regulator 12, like reference numerals, modified by the lower case "a" have been applied to identify like parts. In the auxiliary regulator 14, the pressure in the jacket 30a is not controlled by a pilot, but at any given time is held at a fixed level $P_{ja}$ from suitable source, such as a gas bottle 42, somewhere between the pressure $P_1$ and the desired downstream pressure $P_3$, which in FIG. 1 is the pressure being monitored.

In operation, the main regulator 12, as well as the auxiliary regulator 14, are usually partially open to flow to maintain the desired pressure $P_3$ in the downstream line 39. If the pilot 36 senses a decrease in downstream pressure $P_3$, it bleeds the jacket 30 further to enable increased flow through the regulator 12 to raise its outlet pressure $P_2$, thereby to increase flow through the auxiliary regulator 14 simply by reason of greater differential over the fixed jacket pressure $P_{ja}$, until the desired outlet pressure $P_3$ is restored. Likewise, if the pilot detects an excessive pressure in downstream line 39 it throttles, in order to build up pressure in the jacket 30 and reduce flow through the main regulator 12, reducing intermediate pressure $P_2$ and, hence, flow through the auxiliary regulator 14, until the desired pressure $P_3$ is again achieved.

While the jacket pressure $P_{ja}$ is described as fixed at any given time, it is to be understood that it may be programmed to be increased or decreased to meet changing conditions of operation. Moreover, while in normal operation the jacket pressure $P_{ja}$ is intermediate the inlet and outlet pressures the auxiliary regulator 14 may be inactivated to increase flow as when inlet pressure $P_1$ is at a low level, by reducing the jacket pressure $P_{ja}$ to less than outlet pressure.

The Embodiment of FIG. 2

If the pressure drop from upstream pressure $P_1$ to ultimate downstream pressure $P_3$ is so great that cavitation still takes place, additional stages may be employed by adding one or more passive back pressure regulators 14b and 14c, as shown in FIG. 2. Hence, in operation, when the pilot 36 detects a need for adjustment of the downstream pressure $P_3$ at downstream line 39, it functions to decrease or increase pressure in the jacket 30, which results in increased or decreased flow through the main regulator 12, raising or reducing the pressure $P_2$ which acts against the jacket pressure $P_{ja}$ of the first auxiliary regulator 14a. Flow through the first auxiliary regulator 14a exits at $P_{2a}$ and overcomes a lower jacket pressure $P_{jb}$ in a second auxiliary regulator 14b, discharging there at pressure $P_{2b}$ to overcome the jacket pressure $P_{jc}$ in the jacket 30c of the next auxiliary regulator 14c.

Despite the anumber of auxiliary passive regulators 14a, 14b and 14c employed, the main regulator 12 reacts only to the pilot 36, which in FIGS. 1 and 2 dictates operation of the main regulator in response to signals it receives in detection or monitoring of downstream pressure $P_3$ in line 39. The passive regulators are direct-acting back pressure regulators controlled by their jacket pressures $P_{ja}$, $P_{jb}$, $P_{jc}$. The passive regulators respond on through each of them any increase or decrease of flow required of the main regulator 12 by the pilot 36, so that it may maintain pressure $P_3$ at the desired level. This system, using a single pilot-operated main regulator 12, avoids the risk of unstable operation which could be precipitated by the interaction of two or more pilots, each of which has a significant time of response, while the advantages of multi-stage operation, such as reduced erosion on working parts and freedom from the damaging effects of cavitation, are achieved through the addition of passive back-pressure regulators acting in tandem with the pilot-operated regulator.

The Embodiment of FIG. 3

In this embodiment, the pilot 36 is sensing upstream pressure $P_1$ through signal sensing conductor 47 and is set to open in the event that upstream pressure $P_1$ becomes excessive. In that event, the pilot 36 bleeds pressure $P_j$ from the jacket 30, through line 38 to the downstream line 39. This allows increased flow through the main regulator 12 and, in turn, through the auxiliary passive regulator 14. When back pressure $P_1$ returns to the desired level the pilot 36 reduces bleeding to the downstream line 39 and flow through the main regulator 12 is throttled, while auxiliary regulator 14 follows and throttles automatically.

The Embodment of FIG. 4

Here, the main regulator 12 is used to control rate of flow in the pipeline and, toward that end, an orifice plate 48 is installed and lines 44 and 46 conduct fluid on opposite sides of the orifice so that pressure drop, indicative of flow rate can be detected. If that pressure drop is inadequate, the pilot 36 will command increased bleeding of the main regulator jacket 30, enabling increased flow through the main regulator 12 and, automatically, through another stage in the auxiliary regulator 14. Similarly, an excessive pressure drop will cause pilot 36 to restrict bleeding, and throttle flow through main valve 12, with auxiliary valve 14 following.

While this invention has been described in conjunction with preferred embodiments thereof, it is obvious that modifications and changes therein may be made by those skilled in the art to which it pertains, without departing from the spirit and scope of this invention, as defined by the claims appended hereto. For example, while a pressure responsive pilot valve 36 is illustrated, this is by way of example only, and there are a number of other pilot devices which could control pressure level in the control chamber or jacket 30 in response to a signal representative of a pressure level or flow condition in a selected pipeline location, whether such signal be fluid pressure or pressure differential, mechanical, electronic or in some other known form, and this invention is not restricted in that respect.

What is claimed as invention is:

1. A multi-stage pressure reducing system comprising:
    a main pressure-responsive valve in a pipeline conditioned to open progressively in accordance with the extent to which upstream pressure therein overcomes pressure in a main chamber therein;
    a load line connecting a source of line-control pressure fluid to said main chamber;
    a bleed line connecting said main chamber to a zone of low pressure
    a pilot in said bleed line conditioned to enable bleeding from said main chamber through said bleed line to control the level of pressure in said main chamber so as to maintain a pipeline fluid flow characteristic sensed thereby at a desired level, by reducing pressure in said main chamber through increased bleeding when said sensed characteristic indicates a need for increased flow to a location downstream of said main valve and by increasing pressure in said main chamber through reduced bleeding when said sensed flow characteristic indicates a need for decreased flow to said downstream location;
    at least one pipeline fluid flow characteristic sensing conductor to said pilot from a selected location in said pipeline;
    an auxiliary pressure responsive valve in said pipeline intermediate said main valve and said downstream location, conditioned to open progressively in accordance with the extent to which inlet pressure therein overcomes pressure in a chamber therein; and
    a source of gas at a fixed intermediate pressure lower than pressure in said main chamber and uninfluenced by fluid flow characteristics in said pipeline, connected to said auxiliary valve chamber.

2. The system defined by claim 1 wherein said main valve comprises:
    a main expansible tube valve including a circular barrier centered in a housing and a flexible tube stretched around said barrier with a jacket space around said tube forming said main chamber.

3. The system defined by claim 2 wherein said auxiliary valve comprises:
    a second expansible tube valve including a circular barrier centered in a housing and a flexible tube stretched around said barrier with jacket space around said tube forming said main chamber.

4. The system defined by claim 1 wherein:
    said intermediate pressure is at a level intermediate the inlet pressure of said main valve and the desired pressure at said downstream location.

5. The system defined by claim 1 including:
a second auxiliary pressure-responsive valve in said pipeline intermediate said auxiliary valve and said downstream location, conditioned to open progressively in accordance with the extent to which its inlet pressure overcomes pressure in a chamber; and
a source of gas, at a fixed secondary pressure lower than said intermediate pressure, connected to said second auxiliary valve chamber.

6. The system defined by claim 1 wherein:
there are a plurality of auxiliary pressure-responsive valves in said pipeline arranged in tandem intermediate said main valve and said downstream location, each conditioned to open progressively in accordance with the extent to which its inlet pressure overcomes pressure in a chamber; and
a source of gas at a fixed pressure connected to each of said auxiliary valve chambers the pressures at said sources being at fixed progressively lower levels intermediate the pressure of said main valve chamber and the desired pressure at said downstream location.

7. The system defined by claim 1 wherein:
said pilot is conditioned to increase bleeding from said main chamber when pressure sensed thereby falls to a predetermined level; and
said sensing signal conductor is connected to said pipeline near said downstream location.

8. The system defined by claim 1 wherein:
said pilot is conditioned to increase bleeding from said main chamber when pressure sensed thereby exceeds a predetermined level; and
said sensing signal conductor is connected to said pipeline upstream of said main valve.

9. The system defined by claim 1 including:
an orifice in said pipeline; and
said sensing signal conductor is connected from each side of said orifice to said pilot valve to transmit a signal representative of flow therethrough.

10. The system defined by claim 1 wherein:
said source of line-control pressure fluid is the pipeline upstream of said main pressure-responsive valve; and
said zone of low pressure is the pipeline at a downstream location.

* * * * *